UNITED STATES PATENT OFFICE.

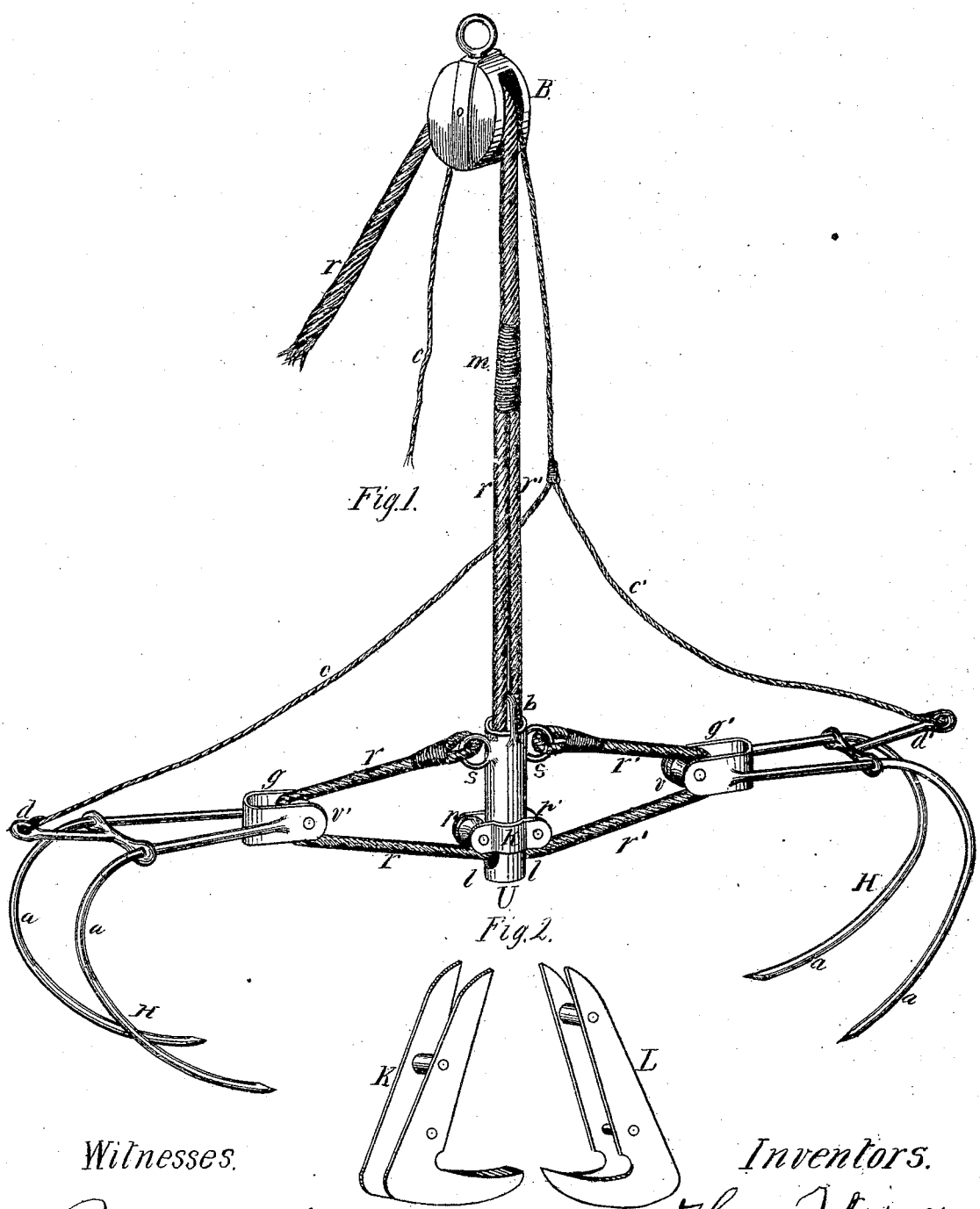

HENRY WHITALL, OF PHILADELPHIA, PENNSYLVANIA, AND JAMES BURSON, OF YATES CITY, ILLINOIS.

IMPROVEMENT IN GRAPPLES.

Specification forming part of Letters Patent No. 119,729, dated October 10, 1871.

*To all whom it may concern:*

Be it known that we, HENRY WHITALL, of No. 512 Arch street, in the city of Philadelphia and State of Pennsylvania, and JAMES BURSON, of Yates City, in the county of Knox and State of Illinois, have made new and useful Improvements in Grapples, by which hay, straw, and other articles to be elevated or lowered may be more easily grappled onto and safely conveyed to its place of destination; and we do declare the following to be a full, clear, and exact description thereof, reference being had to the accompanying drawing and letters of reference thereon.

Our invention relates to the use of a tubular upright for the passage of cords and attachment of pulleys and staples, whereby hooks adapted to the object to be raised or lifted or lowered are drawn horizontally together; and it relates to a simple method of detachment, whereby joints, springs, and other complications are dispensed with.

In the drawing, Figure 1 is a perspective view of the device as required for hay or straw. Fig. 2 is a view of hooks as required for stone.

In construction, we take a section of common metallic tubing, U, of sufficient size to admit the passage of cords $r\ r'$, and make the two lateral openings $l\ l$ near the lower end, for the passage of the cords $r\ r$ from the top down to said openings and out through them, as shown. A rigid bail, $b$, on the upper end serves as a partition to prevent the twisting of the cords, as also for the ordinary purpose of a bail. The upright U is provided with staples S S', to which the ends of the cords $r\ r'$ are fastened, and rollers $p\ p^1$ over opening $l\ l$, for the said cord to work under. Each hook H consists of two tines, $a\ a$, attached to a curved metallic plate, $g$, inclosing a roller, $v$. The tines have T-levers $d\ d$ fitted to them, as shown, for the attachment of trip-cord $c\ c'$ for the purpose of detaching the load.

The hoisting cord $r$, having two branches below the splice $m$, is passed through tube U, with one branch on each side of bail $b$, under rollers P P, through openings $l\ l$, around rollers $v\ v$ in blocks $g\ g$ of hooks H H, to staples S S' on upright U, to which the ends are securely attached. To grasp the load the trip-cord $c\ c'$ must be slack when the hooks H H are extended, each end of cords $c\ c'$ being attached to handles $d\ d$. To detach the load, release the rod $r$ and retain cord $c$. As clearly shown, the hoisting cord $r$ extends through block B, to draw the hooks together and raise the load.

To operate in water we make the upright U above staples S S' of sufficient length to reach the surface of the water to be operated in, using such grapples as the work may require. For stone lifting we detach hooks H H and attach hooks K L, Fig. 2. We do not confine ourselves to a tube in the construction of upright U.

We claim as our invention—

1. Upright U, constructed substantially as described, and for the purposes set forth.

2. The combination of the cord $r\ r$, upright U, hooks H H, and the trip-cord $c$, substantially as described.

HENRY WHITALL.
JAMES BURSON.

Witnesses:
JAMES BOULTER,
LORING WATSON.

(63)